Aug. 29, 1967 J. B. RANSON 3,338,489

TAPE HANDLING DEVICES

Filed Dec. 14, 1964

INVENTOR

John Bryan Ranson

BY

Cushman, Darby & Cushman

ATTORNEYS

United States Patent Office 3,338,489
Patented Aug. 29, 1967

3,338,489

TAPE HANDLING DEVICES

John Bryan Ranson, Watford, England, assignor to Associated Automation Limited, London, England, a British company Filed Dec. 14, 1964, Ser. No. 418,176
Claims priority, application Great Britain, Dec. 17, 1963, 49,699/63
7 Claims. (Cl. 226—50)

This invention relates to a tape handling device for use, for example, with a tape reader.

In order that a tape reader may operate satisfactorily it is desirable for the speed of the tape to be read to reach a required reading speed with a minimum of delay. This delay is dependent on a number of factors including the magnitude of back tension to which the tape is subjected during reading.

It is an object of this invention to provide a tape handling device for controlling the back tension and accordingly there is provided a tape device for use in conjunction with a tape reader wherein tape is drawn from a supply and threaded in a letter S formation through a system comprising two contrarotatable capstans and forms an angle of lap of not less than 180°, with each capstan. The capstans are preferably driven and rotatable about parallel axes thereby producing a servo assistance for the tape reader to dispense tape from the supply. Conveniently, the supply may be taken from a reel housed within a dispenser.

Where a device as set out above is used in conjunction with a tape reader tension is applied to the tape between the reader and the capstans by the feeding action of the tape reader and as the tension increases in that part of the tape, the tension between the supply reel and the capstans increases by a magnified amount. The amount of magnification is dependent on the angle of lap of the tape on the capstans and the co-efficient of friction between the tape and the capstans. Preferably, the angle of lap is within the range 180°–240°.

We have found that by increasing the co-efficient of friction between the tape and the second capstan, considered with respect to the direction of tape fed from the supply reel to the tape reader, that the reel begins to accelerate, for all practical purposes, as soon as the tape is moved by a moving means of the tape reader. Further, by increasing the co-efficient of friction as mentioned, the back tension applied to that part of the tape between the captsans and the reader may be readily controlled, and kept to a minimum.

According to a feature of this invention we, therefore provide a tape device including a capstan system, comprising two contra-driven capstans having peripheral surfaces which produce different co-efficients of friction with a tape to be dispensed which, in use, is threaded to form an angle of lap with each capstan. Preferably the peripheral surface of the second capstan considered with respect to the direction of feed has a higher co-efficient of friction than the peripheral surface of the other capstan. The second capstan may be sleeved with a material having the required co-efficient of friction, for example, a natural or synthetic rubber, such as silicone rubber, a plastic material or a metal having its surface treated as required. We have found that silicone rubber sleeves are particularly advantageous owing to the inherent properties of heat resistance. Further such sleeves do not powder in operation.

The underlying system of contra-rotatable capstans may be used for tape readers which read tape fed in one direction alone, or, in tape readers employing a bidirectional reading head. According to one aspect of this invention there is provided a tape handling device including two capstan systems as referred to above, a tape supply and take-up means associated with each capstan system, a bidirectional tape reader for reading tape fed in either direction between the systems and means for selectively rendering freely rotatable one capstan in each system. The said means is preferably such that one capstan in that system towards which tape is, in use, being fed, is freely rotatable and the other capstan is driven in a direction opposite to the direction of tape feed.

Two applications of tape handling device in accordance with this invention will now be described by way of example with reference to the accompanying drawings in which.

Figure 1:
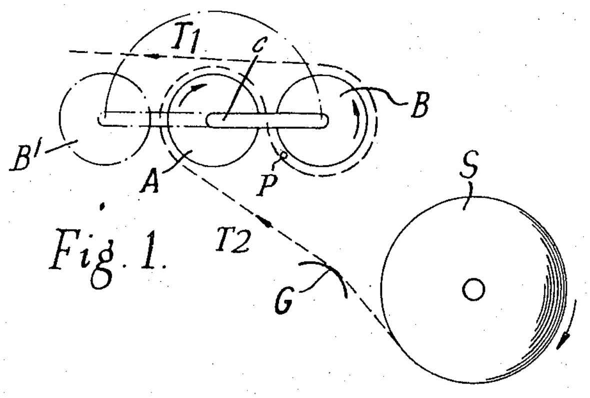
FIGURE 1 shows a dispenser for use with a uni-directional tape reader.

The device shown diagrammatically in FIGURE 1 has a capstan system comprising two contra-rotatable capstans A and B, linked together by an arm C. The arm C enables capstan B to be angularly moved from the dot/dash line position B′ to the full line position B which facilitates threading of tape around the capstans from a spool S.

In order to thread tape to assume a letter S formation as shown in FIGURE 1, the tape is initially threaded between the capstan A, and capstan B in the B′ position. Angular movement of capstan B in a clockwise direction will then result in the tape assuming the dotted position shown.

In order that a tape reader may read punched tape from an 8 inch diameter supply reel S weighing approximately 2½-lbs. and reach a full operating speed of 25 inches per second within 10 milliseconds, the back tension T, in the tape reader must not exceed 50 grams.

To control the back tension $T_1$, below 50 grams, a dispenser comprising two 1″ diameter contra-rotating capstans A and B at a centre distance of 1.3/32″ and revolving at 1400 r.p.m. is used. The tape was laced through these capstans in a letter S configuration, as shown, thus effecting a servo assistance for the tape reader, to dispense tape from the reel. As $T_1$ increases due to the feed of tape by the tape reader, $T_2$ increases by a magnified amount, determined by the system (angle or lap and co-efficient of friction between the tape and capstans).

To meet the acceleration required to reach full operating speed in 10 milliseconds, capstan B is sleeved with a material having a high friction coefficient. This arrangement results in an acceleration of the spool as soon, for all practical purposes, as the tape moved, with negligible tension, limiting the back tension to below 50 grams when experiencing maximum acceleration.

Capstan A serves to control the tape, add further servo assistance during acceleration and limit the effect of tape creep when reel size is very small.

The device of FIGURE 2 has two capstan systems A2/B2 and A3/B3 similar to that described with reference to FIGURE 1. Capstans A2/A3 having sleeves of high co-efficient of friction. The two capstan systems are, as shown, disposed one on each side of a bi-directional tape reader TR, and associated with each capstan system is a reservoir R2, R3 and a spool S2, S3. Each reservoir has a photo-electric sensing device P2, P3 for sensing when the level of tape loop reaches a certain position. Further, each reservoir has a guide G2, G3 for guiding tape between a capstan system and the bi-directional tape reader TR as required.

Each spool S2, S3 has a conventional clutch and brake arrangement not shown and each spool may be driven in the directions of arrows S4, S5 to spool or rendered freely rotatable in the direction of arrows D4, D5 to dispense. The appropriate spool clutches (not shown) apply a small amount of spooling torque when dispensing in order to avoid over-spill.

Figure 2:
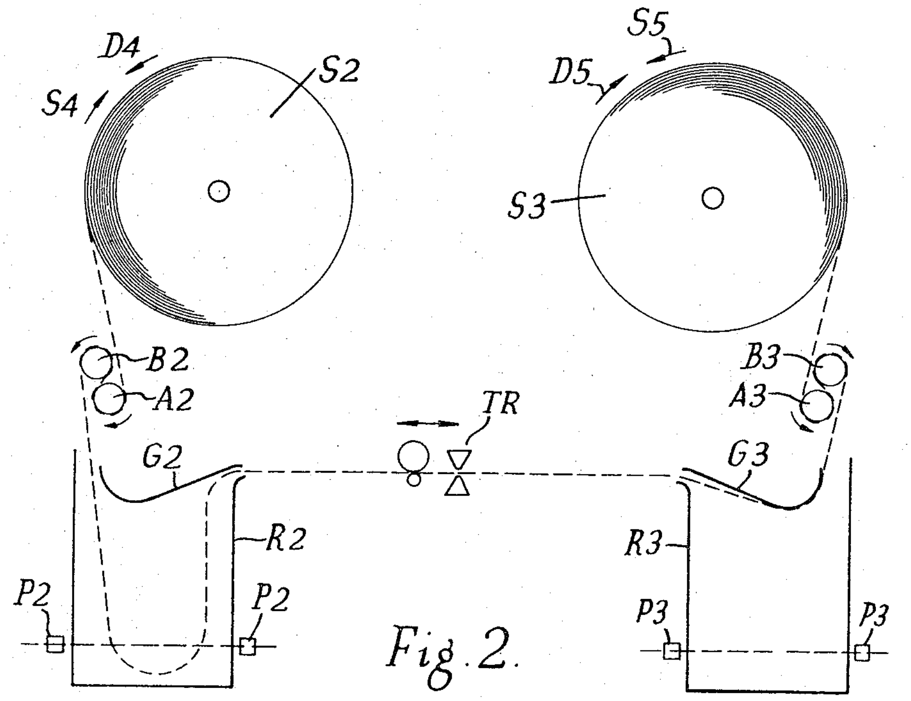
FIGURE 2 shows a dispenser for use with a bidirectional tape reader.

The tape handling system of FIGURE 2 also includes system logic to control operation of spool clutches and brakes, tape reader operation and engagement control of the capstans A2, A3, which, as indicated earlier, are selectively operable either to drive or to be freely rotatable.

In operation, when tape reader TR is reversed by say, computer command, the tape handling system reverses. By virtue of the design, no delay is experienced, provided, say 50 milliseconds have elapsed since the tape has responded to the last previous directional command.

Assuming the tape reader is reading from right to left, as viewed in FIGURE 2. Right hand spool S3 is dispensing and both capstans A3, B3 are engaged. The tape passes around the guide G3 as shown clear of reservoir, through reader TR and flows down into the left hand reservoir. When the tape loop cuts the light beam from photoelectric cell P2, the left hand spool clutch engages and releases its brake. Tape is then hauled from the reservoir R2 around the capstan B2 which is free, having been disengaged from drive, around the driver capstan A2 which is rotating against the direction of the tape. Rotation of A2 against the direction of tape feed applies sufficient tension to give a reasonably tight and even spool and onto the spool S2. When the light beam from P2 is uncovered, the spool clutch drive is released and the brake applied. This sequence is repeated at varying rates according to tape speed.

On reversal of the system, clutch and brake control is transferred to right hand side, spool S3. Right hand driven capstan is disengaged, left hand driven capstan is engaged, left hand spool is free. There is sufficient tape remaining in the reservoir to cater for time constants of system.

From the above, it will be appreciated that the reservoir is only used on the side that is spooling.

Although specific reference has been made above to the device being used with capstan driven at 1400 r.p.m., that is, primarily for low speed reading. The devices of the invention are equally adaptable for use with high speed tape readers and in these circumstances we prefer to provide both capstans of the systems with peripheral surfaces having low co-efficients of friction thereby reducing the mechanical advantages of the system and consequent tensile stress on the tape.

In order to limit the degree of tape creep when only a small amount of tape remains on the spool being dispensed, the tape is threaded over a pin P or freely rotatable roller disposed adjacent capstan B, as shown in FIGURE 1. In this way, the angle of lap or area of contact the tape has with capstan B, is reduced. The amount of tape creep is reduced since the provision of the pin serves to hold the tape clear of capstan B when tension T1 is zero.

Although specific reference has been made to the use of a bi-directional tape reader TR (see FIGURE 2) the bi-directional reader unit may according to requirements be replaced by for example, a combined bi-directional reader and punch. This has the advantage that punched information can be checked and, should such information be found incorrect, the tape can be back-stepped and the information cancelled.

What we claim is:

1. A tape handling device for use with two tape readers having two capstan systems, with each of said systems comprising:

two contra-rotatable capstans spaced from one another and having parallel axes of rotation, said capstans being positioned between a reader and a supply for said tape, said capstans being disposed relative to a tape to receive the tape between and around the capstans in substantially a letter S configuration and with the tape forming an angle of lap of not less than 180 degrees with each capstan, and including means for moving one of said capstans angularly about the center of rotation for the other of said capstans, and a tape supply and take-up means associated with each of said capstan systems, a bi-directional tape reading tape fed in either direction between the systems, and including means for selectively rendering freely rotatable one capstan of each system.

2. A handling device according to claim 1 wherein the peripheral surface of the second capstan, considered with respect to the direction of tape feed has a higher co-efficient of friction than the peripheral surface of the other capstan.

3. A tape handling device according to claim 1 wherein the peripheral surfaces of the selectively freely rotatable capstans have higher co-efficients of friction than the peripheral surfaces of the other capstans.

4. A tape handling device according to claim 1 wherein tape between the systems enters and leaves the respective systems around the selectively freely rotatable capstans.

5. A tape handling device according to claim 4 including a reservoir for tape associated with each capstan system and disposed between the systems and the bi-directional tape reader.

6. A tape handling device according to claim 5 including means for sensing the amount of tape in each reservoir.

7. A tape handling device according to claim 6 wherein said sensing means is a photo-electric cell.

References Cited

UNITED STATES PATENTS

| | | | |
|---|---|---|---|
| 2,169,143 | 8/1939 | Hardenberg | 226—195 X |
| 2,432,876 | 12/1947 | Formhals | 242—75.42 |
| 2,678,551 | 5/1954 | Lambach | 280—21 |
| 2,756,873 | 7/1956 | Hartley | 226—112 |
| 2,831,678 | 4/1958 | MacNeill | 226—50 |
| 2,968,702 | 1/1961 | Fay | 226—195 X |
| 3,020,621 | 2/1962 | Sacks | 226—195 X |
| 3,246,818 | 4/1966 | Davis | 226—90 |

M. HENSON, Jr., *Primary Examiner.*

R. A. SCHACHER, *Assistant Examiner.*